United States Patent [19]
Pawate et al.

[11] Patent Number: 5,528,550
[45] Date of Patent: Jun. 18, 1996

[54] APPARATUS, SYSTEMS AND METHODS FOR IMPLEMENTING MEMORY EMBEDDED SEARCH ARITHMETIC LOGIC UNIT

[75] Inventors: Basavaraj Pawate, Dallas, Tex.; George Doddington, McLean, Va.; Shivaling S. Mahant-Shetti, Richardson, Tex.; Derek Smith, Lafayette, La.

[73] Assignee: Texas Instruments Incorporated, Dallas, Tex.

[21] Appl. No.: 69,308

[22] Filed: May 28, 1993

[51] Int. Cl.⁶ .................................................. G11C 13/00
[52] U.S. Cl. ...................... 365/230.03; 365/49; 371/21.1
[58] Field of Search ................................. 365/49, 230.03; 371/23; 395/425

[56] References Cited

U.S. PATENT DOCUMENTS 5,390,139  2/1995  Smith et al. ............................... 365/49

FOREIGN PATENT DOCUMENTS

0488297A2  11/1991  European Pat. Off. .

WO90/04830  10/1989  WIPO .

OTHER PUBLICATIONS

Control Storage Use in Implementing an Associative Memory for a Time-Shared Processor, Leo Hellerman, et al., IEEE Transactions on Computers, vol. C–17, No. 12, Dec. 1968, pp. 1144–1151.

Associative and Data Processing Mbit–DRAM, Kowarik, et al. Proc. IEEE Int. Conf. on Computer Design, 90', Sep. 90, Cambridge, Mass., US, pp. 421–424.

Primary Examiner—Terrell W. Fears
Attorney, Agent, or Firm—Mark A. Valetti; W. James Brady, III; Richard L. Donaldson

[57] ABSTRACT

An active memory 14 is provided which includes a data memory 20 including rows and columns of storage locations for holding data. A broadcast memory 22 is provided which includes rows and columns of storage locations for holding control instructions. Search circuitry 26, 52 is provided which is operable to receive at least one word of data from data memory 20 and test the word against a preselected search test condition. Control circuitry 24 is operable in response to control instructions received from the broadcast memory 22 to control the transfer of the word of data from the data memory 20 to the search circuitry 26, 52 and the test of the word by the search circuitry 26, 52.

19 Claims, 2 Drawing Sheets

5,528,550

APPARATUS, SYSTEMS AND METHODS FOR IMPLEMENTING MEMORY EMBEDDED SEARCH ARITHMETIC LOGIC UNIT

NOTICE (C) Copyright, *M* Texas Instruments Incorporated, 1993. A portion of the Disclosure of this patent document contains material which is subject to copyright protection. The copyright and mask work owner has no objection to facsimile reproduction by anyone of the patent document or the patent disclosure, as it appears in the U.S. Patent and Trademark Office, patent file or records, but otherwise reserves all rights in its copyright and mask work whatsoever.

CROSS-REFERENCE TO RELATED APPLICATIONS

The following coassigned patents and applications are hereby incorporated herein by reference:

U.S. Patent application Ser. No. 08/068,909, Attorney Docket No. 32350-714, TI-13438, entitled "Apparatus, Systems and Methods for Distributed Processing", filed May 28, 1993;

U.S. Patent application Ser. No. 08/069,048, Attorney Docket No. 32350-716, TI-13440, entitled "Devices, Systems and Methods for Implementing a Kanerva Memory", filed May 29, 1993; and U.S. Patent application Ser. No. 08/068,908, Attorney Docket No. 32350-717, TI-13441, entitled "Apparatus, Systems and Methods for Distributed Signal Processing", filed May 28, 1992.

TECHNICAL FIELD OF THE INVENTION

The present invention relates in general to data processing and in particular to apparatus, systems and methods for implementing a memory embedded search arithmetic logic unit.

BACKGROUND OF THE INVENTION

As the tasks computing systems are required to perform increase in complexity, the burdens on the central processing unit (CPU), the size of the system memory, and the traffic on the system address and data buses all correspondingly increase. In particular, many types of tasks associated with speech synthesis, image signal processing, and digital signal processing require repetitive performance of basic computing operations in order to treat the data stored in memory. For example, many times it becomes necessary to search through a set organized data occupying a substantial amount of memory. In conventional systems, such a search can take up valuable CPU time, increase the traffic on the system data and address buses, and generally reduce operating efficiency.

SUMMARY OF THE INVENTION

According to the invention, an inactive memory is provided which has a data memory including rows and columns of storage locations for holding data. A broadcast memory including rows and columns of storage locations for holding instructions is also provided. Search circuitry operable to receive at least one word of data from the data memory tests the word against a preselected search test condition. Control circuitry operable in response to control instructions received from the broadcast memory controls the transfer of the word of data from the data memory to the search circuitry and the test of the word by the search circuitry.

According to other embodiments of the invention, the search circuitry is operable to test the word of data retrieved from the data memory by applying a branch condition selected from a set of branch conditions defined by search instructions set held in the broadcast memory.

Apparatus, systems and methods employing the concepts of the present invention efficiently handle computationally intensive applications such as searches through data stored in memory. Such apparatus, systems and methods ease CPU tasks burdens, minimize the amount of memory required and efficiently use bus band width. Further, such an apparatus, systems and methods are preferably compatible with currently available device and system configurations.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The preferred embodiment of the present invention and its advantages are best understood by referring to FIGS. 1–4 of the drawings, like numerals being used for like and corresponding parts of the various drawings.

Figure 1:
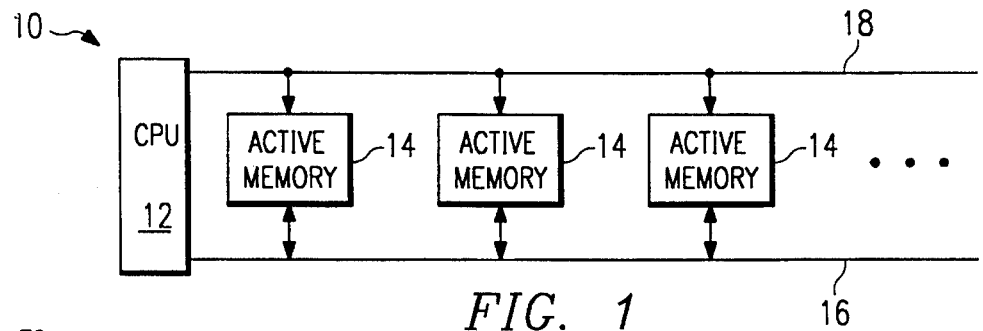
FIG. 1 is a block diagram of a data processing system embodying concepts of the present invention.

FIG. 1 depicts a processing system 10 employing an architecture embodying concepts of the present invention. Processing system 10 includes a central processing unit (CPU) 12 coupled to a number of active memory devices 14 by a data bus 16 and an address bus 18. In the architecture of FIG. 1, the primary system control and computational capabilities are provided by CPU 12 which may be for example a general purpose microprocessor, a microcontroller, a digital signal processor, or a graphics processor. In addition to providing the data and instruction storage required for general system operation, active memory devices 14 provide for the distributed computing and data handling required for problem solving operations, as discussed in detail below.

In the depicted embodiment of system 10, data intensive operations, especially repetitive operations such as data searches typically required during digital processing and speech synthesis, are distributedly performed using the active memory devices 14. CPU 12 for example, may load a each active memory 14 device with a subset of the raw data required for a given problem. Each active memory 14 then proceeds to perform a given set of operations, such as a search, on the corresponding subset of data while the CPU 12 is free to simultaneously perform other tasks. When the tasks distributed to the active memories 14 are complete, CPU 12 retrieves the results to complete the solution to the problem. Preferably, each active memory 14 in system 10 has a pin configuration compatible with the pin configuration of a chosen conventional ("inactive") memory unit (for example a 28-pin pinout). In this fashion, active memories 14 and conventional inactive memories can be interchanged on a given board or other supporting structure.

In addition to minimizing the computation burdens imposed on CPU 12, distributed processing using active memory devices 14 allows for more efficient utilization of data bus 16 and address bus 18. In essence, active devices 14 compress or reduce data such that the exchange of raw data and intermediate results on data bus 16 and the corresponding transmission of addresses on address bus 18 are substantially reduced.

Figure 2:
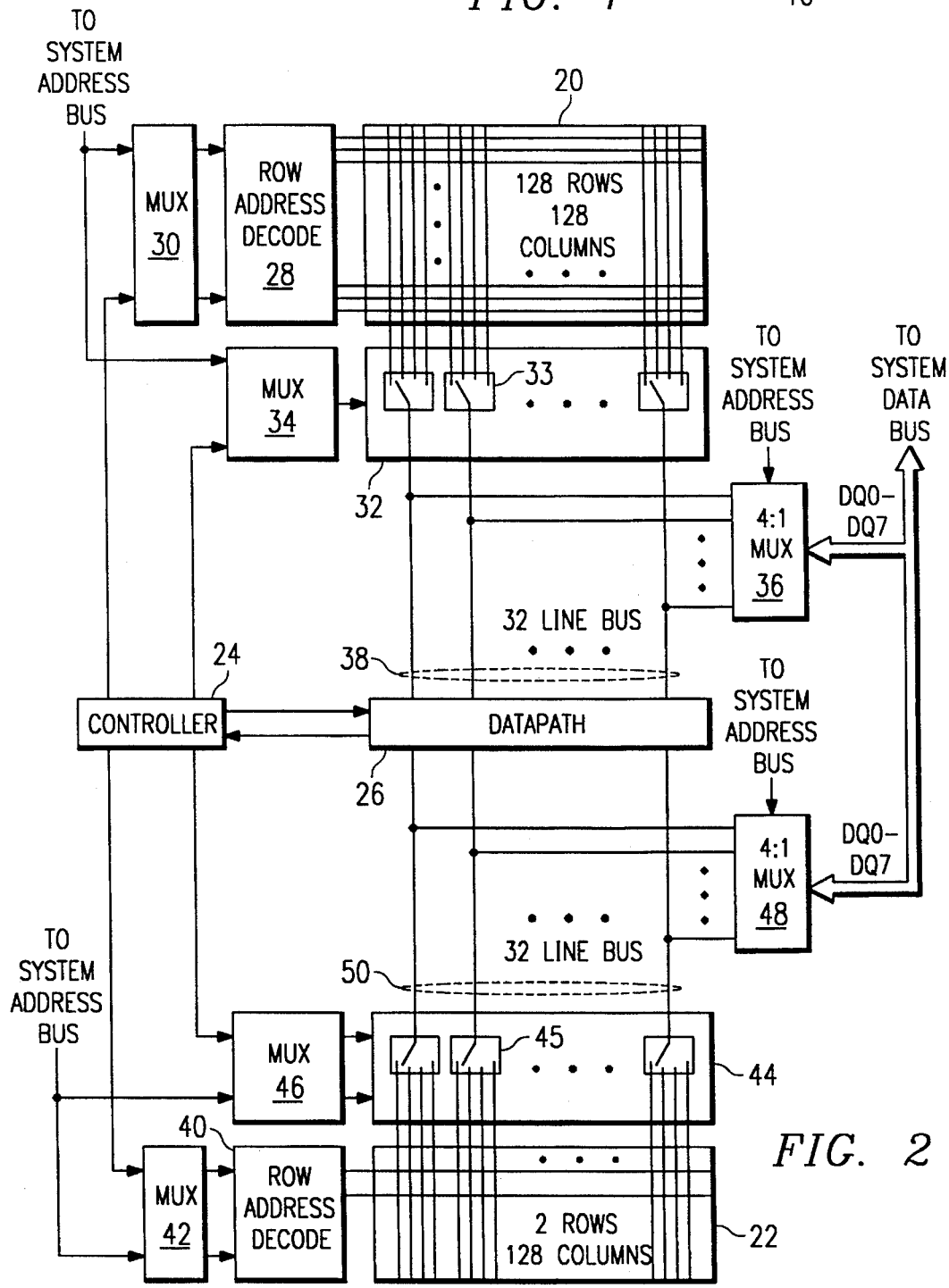
FIG. 2 is a functional block diagram of an embodiment of the active memory devices shown in FIG. 1.

FIG. 2 is a functional block diagram of an illustrative active memory 14 embodying the concepts of the present invention. Active memory 14 may be constructed as a single chip or module (a "device") which includes a data random access memory 20 (RAM), a broadcast RAM 22, a controller 24 and datapath 26. In a single chip embodiment, data RAM 20 and broadcast RAM 22 may be fabricated in a standardized configuration for a given set of devices while controller 24 and datapath 26 are customized to meet the operational requirements for a given device or subset of devices.

Data RAM 20 may be either a static random access memory (SRAM) or a dynamic random access memory array (DRAM). In FIG. 2, RAM 20 is depicted as a 2k×8 memory arranged as 128 rows and 128 columns of RAM cells. It should be noted that in addition to the configuration shown in FIG. 2, any one of a number of alternate RAM architectures may also be used, as is understood in the art. Associated with data RAM 20 is circuitry for reading and writing data to and from selected cells in the array including row address circuitry 28, a row address multiplexer 30, first stage decoding (column address) circuitry 32, column address multiplexer 34 and input/output circuitry 36. Multiplexer 30 passes address bits to the row address circuitry 28 from either system address bus 18 or from the controller 24. The selection can be made in response to either a discrete signal or the value of the address itself. Similarly, multiplexer 34 passes address bits from either the address bus 18 or from controller 24. Multiplexers 30 and 34 along with input/output circuitry 36 allow for the transfer of bits of data into the cells of data RAM either from CPU 12 using data bus 16 and address bus 18 or from datapath 26 using internal bus 38.

In the embodiment of FIG. 2, first stage decoder 32 multiplexes each set of four adjacent bitlines to form an internal bus 38 which is 32 bits wide (if for example a 256 column memory architecture was used, then the internal bus would be 64 bits wide). In the illustrated embodiment, I/O circuitry 36 includes a four to one multiplexer which selects, in response from address bits from address bus 18, one of four sets of eight adjacent bits on 32-bit internal bus 38 for communication to the system data bus 16. It should be noted that in alternate embodiments the configuration of input/output circuitry may vary depending on such factors as the width of internal bus 38 and the number of lines (bits) communicating with system data bus 16.

Broadcast RAM 22 may also be either static or dynamic and is similarly associated with circuitry for writing and reading data into and out of its memory cells array including row address circuitry 40, row address multiplexer 42, first stage (column) decoding circuitry 44, multiplexer 46 and input/output circuitry 48. In FIG. 2, broadcast RAM is organized as 2 rows and 128 columns, although alternate row/column organizations may be used in other embodiments. The read/write circuitry associated with broadcast RAM 22 operates similar to the read/write circuitry associated with data RAM 20. First stage decoder circuitry 44 in the illustrated embodiment performs 4:1 multiplexing on each four adjacent columns of the 128 columns memory cells in broadcast RAM 22 with selected 32 bits coupled to datapath 26 via a second internal bus Multiplexers 42 and 46 selectively pass address bits from either system address bus 18 or from controller 24. Thus, multiplexers 42 and 46 along with input/output circuitry 48 allow for the transfer of data into the cells of broadcast RAM 26 from either CPU 12 via or from controller 24 through datapath 26.

As with the corresponding circuitry associated with data RAM 20, the specific configurations of row address circuitry 40, multiplexers 42 and 46, first stage decode circuitry 44, and input/output circuitry 48 will vary based on such factors as the numbers of rows and columns in the cell array of broadcast RAM 22, the width of internal bus 50, the number of bits being received from the system address bus 18 and the number of bits (lines) communicating with the system data bus 14. The coupling of data bus 16 with input/output circuitry 36 associated with data RAM 20 and input/output circuitry 48 associated with broadcast RAM 22 is preferably made through a single set of pins (D0–D7) to provide compatibility with conventional memory pinouts. Similarly, the coupling of the read/write circuitry associated with both data RAM 20 and broadcast RAM 22 may be made through a single set of pins (also not shown). Since active memories 14 are part of the system memory, it is preferable that memories 14 take on the characteristics of memory chips. In other words, Memories 14 should be efficient like memory chips, small in size and relying on a minimum number of data and address pins which are compatible with the pin configurations of conventional ("inactive") memory chips.

Datapath 26 under the control of controller 24 routes data on internal bus 38 and 50 and provides the desired distributed computational capabilities. Datapath 26 may be implemented in random logic, in programmable gate array circuitry, or in programmable logic array circuitry, as required to customize the chip or unit to perform the desired computational functions. For example, datapath 26 may include adders and multipliers to implement the matrix multiplier example or comparitor circuitry in speech applications. Further, both controller 24 and datapath 26 may together be implemented in digital signal processing circuitry, such as that found in the Texas Instruments TI-320 family of digital signal processors.

In the preferred embodiment of system 10, each Broadcast RAM 22 is placed at the highest address space available for the corresponding number of address bits received by active memories 14 from system address bus 18 This allows each broadcast RAM 22 to be written to or read from without a chip select signal. Further, all the broadcast RAMs 22 of the active memories 14 in system 10 can be accessed simultaneously. The broadcast Ram 22 for a given memory 14 receives instructions and data from CPU 12 on data bus 16 for use by controller 26 in carrying out a selected computation.

In a typical computation, CPU 12 writes data into the data Ram 20 of each active memory 14 from data bus 16. Typically each data RAM 20 holds a different subset of an overall set of data being operated on. For example, in the case of a matrix multiplication, each data RAM 20 might hold the data for a corresponding row in the matrices involved. In the cases of search operations, different fields of the data being operated on may be distributed to different active memories 14. A control sequence to be followed by each controller 24 is presented on data bus 16 while the high address bits are presented on address bus 18 such that the control sequence is written into each broadcast RAM 22. Similarly, at least one argument (vector) of the desired computation being performed by system 10 is written into each broadcast RAM 22. Typically, the same vector is written into all the broadcast RAMs 22 in system 10.

In one embodiment, a dummy location in the broadcast memory space initiates execution of the arguments by the controller 24 and datapath 26 of each active memory device 14. In particular, controller 24 causes datapath 26 to apply the arguments retrieved from the broadcast RAM 22 to each row of data from data RAM 20, as dictated by the control sequence. The results from applying the arguments to a given row of data in the respective data RAM 20 are written by controller 24 through datapath 26 back into one or two selected byte locations along the same row. Controller 24 cycles through all row addresses and through the all addresses to the 4 to 1 multiplexer of data RAM first stage decoder 32 such that all the data in the data RAM 20 has been operated on.

While the active memory devices are operating on the data previously written into each of the data RAMs 20, CPU is free to attend to other tasks. CPU 12 subsequently returns to retrieve the reduced (compressed) results from the data RAM 20 of each active memory 14 after the active memories indicate completion of the distributed computational tasks.

Figure 3:
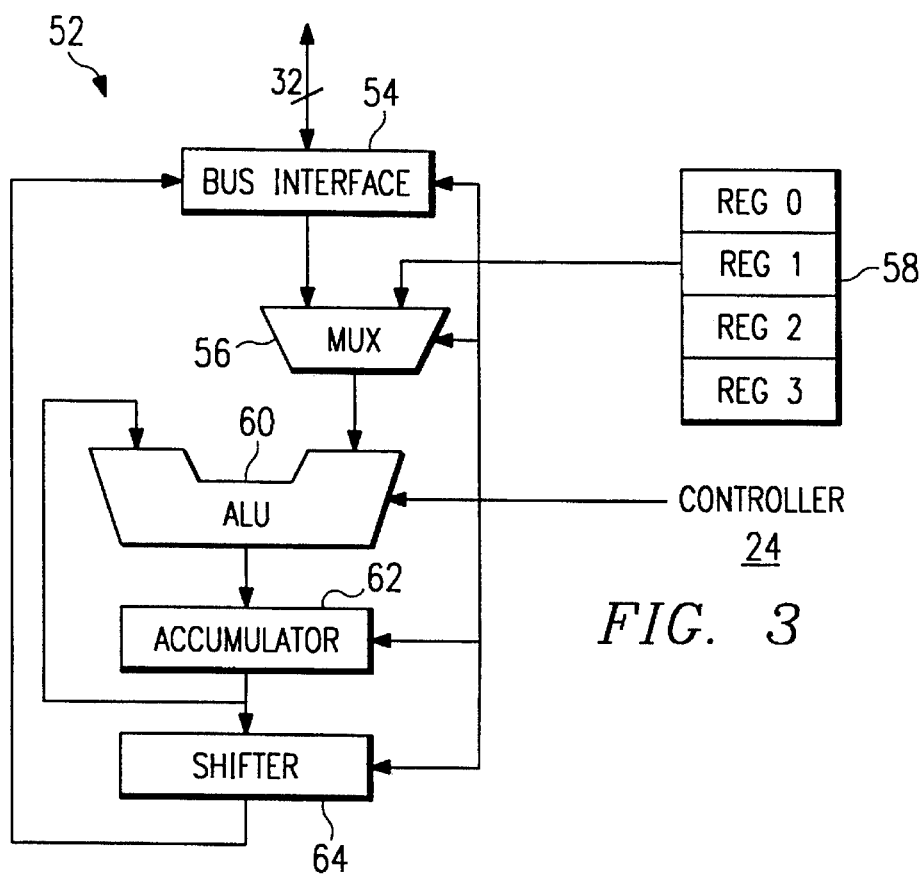
FIG. 3 is a functional block diagram of an embodiment of the search circuitry of the active memory devices shown in FIG. 2.

FIG. 3 depicts an embodiment of an embedded search ALU 52 implemented as part of datapath 26. In general, search ALU 52 provides a means for efficiently searching through data stored in data RAM 20. With multiple active memories 14 in system 10, substantial amounts of data stored across corresponding data RAMs 20 can be searched using a distributed processing approach discussed above.

Search ALU 52 includes a bus interface 54, a multiplexer 56, registers 58, an arithmetic logic unit 60, an accumulator 62, and a shifter 64. Search ALU 52 operates under the control controller 24 using search instructions stored in broadcast RAM 20. An example set of such search instructions are provided as TABLE I:

TABLE I

| INSTRUCTIONS | OPERATION PERFORMED |
| --- | --- |
| LOADAC | Load Accumulator with the contents of the specified RAM location or with the contents of one of the registers. |
| STOREAC | Store the contents of the accumulator in RAM. |
| ADD | Add to the accumulator. |
| SUB | Subtract from the accumulator |
| MPY | Multiply RAM value with one of the registers. |
| Branch < Ø | Accumulator Test Conditions. |
| Branch > Ø | " |
| Branch = Ø | " |
| Branch <> Ø | " |
| Branch ≦ Ø | " |
| Branch ≧ Ø | " |
| IDLE | |
| MAX | Maximum value of specified input and accumulator. Result put in accumulator |

Figure 4:
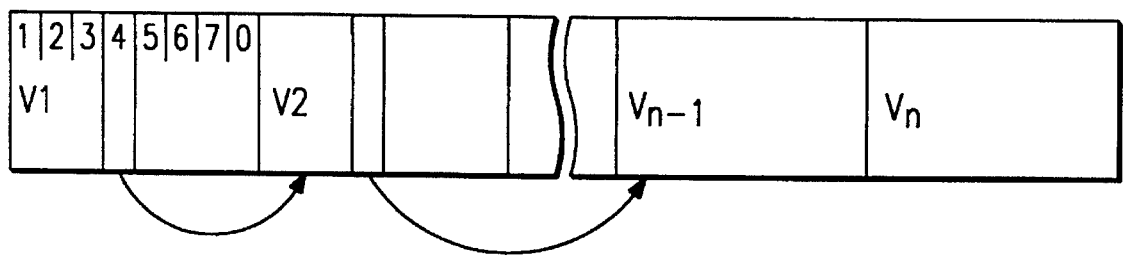
FIG. 4 depicts one possible data format useful for storing data in the active memory device of FIG. 2.

FIG. 4 depicts one possible format for the data being held in data RAM 20. In FIG. 4, an array of vectors is shown in a linked list format. In the linked list format, each vector includes m number of fields of data along with a pointer to another vector in the list or array. The linked list format is only one possible data format and is depicted for illustrative purposes as an efficient format for such purposes.

During a typical search, controller 24 first identifies the address to data RAM 20 holding the first vector in the search data. The first vector is then retrieved from data RAM 20 and provided to search ALU 52 through bus interface 54 and internal bus 38. At least the data field portion of the current vector is loaded into accumulator 62. ALU 60 then performs a desired basic arithmetic operation (add, subtract, multiply, divide) on the data from the accumulator and data retrieved from registers 58, as selected by one or more of the instructions of TABLE I. In the alternative, a masking operation maybe performed by ALU 58 on the vector retrieved from memory 20, using a mask retrieved from registers 58, to extract one or more of the fields of the vector. The performance of an arithmetic or masking operation during a search is not always a requirement for a search; an arithmetic operation is only one means of testing whether a vector from data RAM 20 meets the desired search condition. Next, ALU 60 applies one or more branch conditions (tests), such one of those listed in TABLE I, to the result of the arithmetic operation (or directly on data from either RAM 20 or accumulator 62 if an arithmetic operation is not performed). If the condition is met, search can either be terminated or can be continued to identify further vectors/data fields meeting the desired conditions. If the branch condition is not met, the search continues by retrieving the next vector in data RAM 20 as indicated by the pointer field in the current vector. Shifter 64 allows for the selection of at least some of results from ALU for return to data RAM 20. In this fashion, the current vector can be updated in memory if a desired branch condition is met following a test by ALU 60.

Although the present invention and its advantages have been described in detail, it should be understood that various changes, substitutions and alterations can be made herein without departing from the spirit and scope of the invention as defined by the appended claims.

What is claimed is:

1. An active memory comprising:

a data memory including rows and columns of storage locations for holding data;

a broadcast memory for holding control instructions;

search circuitry operable to receive at least one word of data from said data memory and test said word against a preselected search test condition; and control circuitry operable in response to control instructions received from said broadcast memory to control the transfer of said word of data from said data memory to said search circuitry.

2. The active memory of claim 1 wherein said search circuitry is operable to test said word by applying a branch condition selected from a set of branch conditions defined by a search instruction set held in said broadcast memory.

3. The active memory of claim 1 wherein said search circuitry is operable to test said word by performing an arithmetic operation using said word of data from said data memory and a second word of data retrieved from an associated register and applying a branch condition to a result of said arithmetic operation.

4. The active memory of claim 1 wherein said search circuitry comprises an arithmetic logic unit operable to apply branch conditions to said word of data received from said data memory.

5. The active memory of claim 1 wherein said search circuitry comprises:

a multiplexer for selecting between said word of data retrieved from said data memory and a word of data retrieved from an associated register;

an arithmetic logic unit having a first and second inputs and operable to perform arithmetic operations on and apply branch conditions to, data received at said inputs, said first input receiving words of data selected by said multiplexer; and an accumulator for storing data and results received from said arithmetic logic unit, an output of said accumulator providing feedback to said second input of said unit.

6. The active memory of claim 1 and wherein said control circuitry includes:

a controller operable to interpret said control instructions and control the retrieval of data from said data memory and the performance of arithmetic and branching operations by said search circuitry;

data memory control circuitry for transferring words of data between selected said locations in said data memory and said search circuitry under direction of said controller; and broadcast memory control circuitry for transferring said control instructions between selected locations in said broadcast memory and said controller.

7. The active memory of claim 1 and further comprising:

data memory input/output circuitry for allowing the transfer of said data and results between said data memory and an external bus; and broadcast memory input/output circuitry for allowing the transfer of said control instructions between said broadcast memory and an external bus.

8. The active memory device of claim 1 wherein said active memory is constructed as a single unit; said single unit having a pin configuration compatible with a pin configuration of a selected inactive memory device.

9. An active memory constructed as a single device, said single device having a pin configuration compatible with a pin configuration of a selected inactive memory comprising:

a data memory including an array of memory cells arranged as plurality of rows and columns for holding data bits;

data memory control circuitry coupled to said data memory for selectively transferring data bits between said cells in said data memory and a first internal bus;

a broadcast memory including an array of memory cells arranged as a plurality of rows and columns for holding control bits and instruction bits defining a search instruction set;

broadcast memory control circuitry coupled to said broadcast memory for selectively transferring control and instruction bits between said cells in said broadcast memory and a second internal bus;

a datapath coupled to said first and second internal buses, said datapath including search circuitry operable to receive words of data from said data memory and test said words against a search test condition selected from said search instruction set; and a controller coupled to said datapath, said broadcast memory control circuitry, and said data memory control circuitry, and operable in response to said control bits received from said broadcast memory to direct the transfer of said data bits to said datapath from said data memory, and the test of said data bits by said search circuitry.

10. The active memory of claim 9 wherein said search circuitry is operable to test said word against said search test condition by performing an arithmetic operation using said bits data from said data memory and a bits of data retrieved from an associated register and applying a branch condition to a result of said arithmetic operation.

11. The active memory of claim 9 wherein said search circuitry comprises an arithmetic logic unit operable to apply branch conditions to said bits of data received from said data memory.

12. The active memory of claim 9 wherein said search circuitry comprises:

a multiplexer for selecting between said bits of data retrieved from said data memory and bits of data retrieved from an associated register;

an arithmetic logic unit having a first and second inputs and operable to perform arithmetic operations on and apply branch conditions to, data received at said inputs, said first input receiving bits of data selected by said multiplexer; and an accumulator for storing data and result bits received from said arithmetic logic unit, an output of said accumulator providing feedback to said second input of said unit.

13. The active memory of claim 12 wherein said search circuitry further comprises a shifter for selecting at least some of bits held in said accumulator for transfer to locations in said data memory.

14. The active memory of claim 9 and further comprising data memory input/output circuitry coupled to said first internal bus for transferring data bits between said first internal bus and an external data bus.

15. The memory of claim 9 wherein said data memory control circuitry comprises:

row addressing circuitry for selecting in response to row address bits a said row said data memory containing selected said memory cells to be accessed; and column addressing circuitry for selecting in response to column address bits said columns in said array of said data memory including said selected said memory cells, including a plurality of multiplexers, each said multiplexer selectively coupling a said column from a set of adjacent said columns in said array to said first internal bus.

16. The memory of claim 9 and further comprising broadcast memory input/output circuitry coupled to said second internal bus for transferring control and argument bits between said second internal bus and an external bus.

17. The memory of claim 9 wherein said broadcast memory control circuitry comprises:

row addressing circuitry for selecting in response to row address bits a said row said broadcast memory containing selected said memory cells to be accessed; and column addressing circuitry for selecting in response to column address bits said columns in said array of said broadcast memory including said selected said memory cells, including a plurality of multiplexers, each said multiplexer selectively coupling a said column from a set of adjacent said columns in said array to said second internal bus.

18. The active memory of claim 1, wherein said broadcast memory includes rows and columns of storage locations for holding said control instructions.

19. The active memory of claim 1, wherein said control circuitry is operable in response to said control instructions received from said broadcast memory to control said test of said word by said search circuitry.

* * * * *